(12) United States Patent
Shapiro et al.

(10) Patent No.: US 9,390,192 B1
(45) Date of Patent: Jul. 12, 2016

(54) DISPLAYING PERSONALIZATION FUNCTIONALITY AND HIGHLIGHTING WORK PERFORMED

(71) Applicants: John Robert Shapiro, San Francisco, CA (US); Alexander R. Hood, Oakland, CA (US)

(72) Inventors: John Robert Shapiro, San Francisco, CA (US); Alexander R. Hood, Oakland, CA (US)

(73) Assignee: Intuit Inc., Mountain View, CA (US)

( * ) Notice: Subject to any disclaimer, the term of this patent is extended or adjusted under 35 U.S.C. 154(b) by 180 days.

(21) Appl. No.: 14/145,830

(22) Filed: Dec. 31, 2013

(51) Int. Cl.
*G06F 17/30* (2006.01)
(52) U.S. Cl.
CPC ................ *G06F 17/30899* (2013.01)
(58) Field of Classification Search
CPC .............. G06Q 30/02; G06Q 30/0282; G06Q 30/0631; G06F 17/30014; G06F 17/30882; G06F 17/30899
See application file for complete search history.

(56) References Cited

U.S. PATENT DOCUMENTS

| | | | |
|---|---|---|---|
| 2007/0028266 A1* | 2/2007 | Trajkovic | G06Q 30/02 725/46 |
| 2011/0313967 A1* | 12/2011 | Zafar | G06Q 10/107 706/52 |
| 2012/0021774 A1* | 1/2012 | Mehta | G06Q 30/0282 455/456.3 |

* cited by examiner

*Primary Examiner* — Dinku Gebresenbet
(74) *Attorney, Agent, or Firm* — Osha Liang LLP

(57) ABSTRACT

A method for displaying personalization functionality includes sending information for a user to a server, receiving personalization data from the server with number(s) of entities similar to the user and a personalization action, displaying a number of entities similar to the user, displaying another number of entities similar to the user, displaying the personalization action, and performing the personalization action.

23 Claims, 7 Drawing Sheets

DISPLAYING PERSONALIZATION FUNCTIONALITY AND HIGHLIGHTING WORK PERFORMED

BACKGROUND

Retaining and gaining users for software applications is a constant and vital battle for many businesses. Many times, software applications contain hundreds of different options selectable by the user(s) to tailor the software to their needs. Any improvements in this area may increase user retention, and may be of great value to many businesses.

SUMMARY OF INVENTION

In general, in one or more embodiments, the invention relates to a method for displaying personalization functionality. The method includes sending information for a user to a server, receiving personalization data from the server comprising a first number of entities similar to the user, a second number of entities similar to the user, and a first personalization action. The method further includes displaying the first number of entities similar to the user, displaying the second number of entities similar to the user, displaying the first personalization action, and performing the first personalization action.

In general, in one or more embodiments, the invention relates to a non-transitory computer-readable medium (CRM) storing instructions for displaying personalization functionality. The instructions include functionality to: send a plurality of information for a user to a server, receive personalization data from the server comprising a first number of entities similar to the user, a second number of entities similar to the user, and a first personalization action, display the first number of entities similar to the user, display the second number of entities similar to the user, display the first personalization action, and perform the first personalization action.

In general, in one or more embodiments, the invention relates to a system for displaying personalization functionality. The system includes a server configured to receive a plurality of information for a user, and send personalization data from the server comprising a first number of entities similar to the user, a second number of entities similar to the user, and a first personalization action. The system further includes a user device communicatively coupled to the server. The user device comprises a processor and a memory storing instructions executable by the processor, the instructions comprising functionality to: send the plurality of information for the user to the server, receive the personalization data from the server comprising the first number of entities similar to the user, the second number of entities similar to the user, and the first personalization action, display the first number of entities similar to the user, display the second number of entities similar to the user, display the first personalization action, and perform the first personalization action.

Other aspects and advantages of the invention will be apparent from the following description and the appended claims.

DETAILED DESCRIPTION

Figure 1:
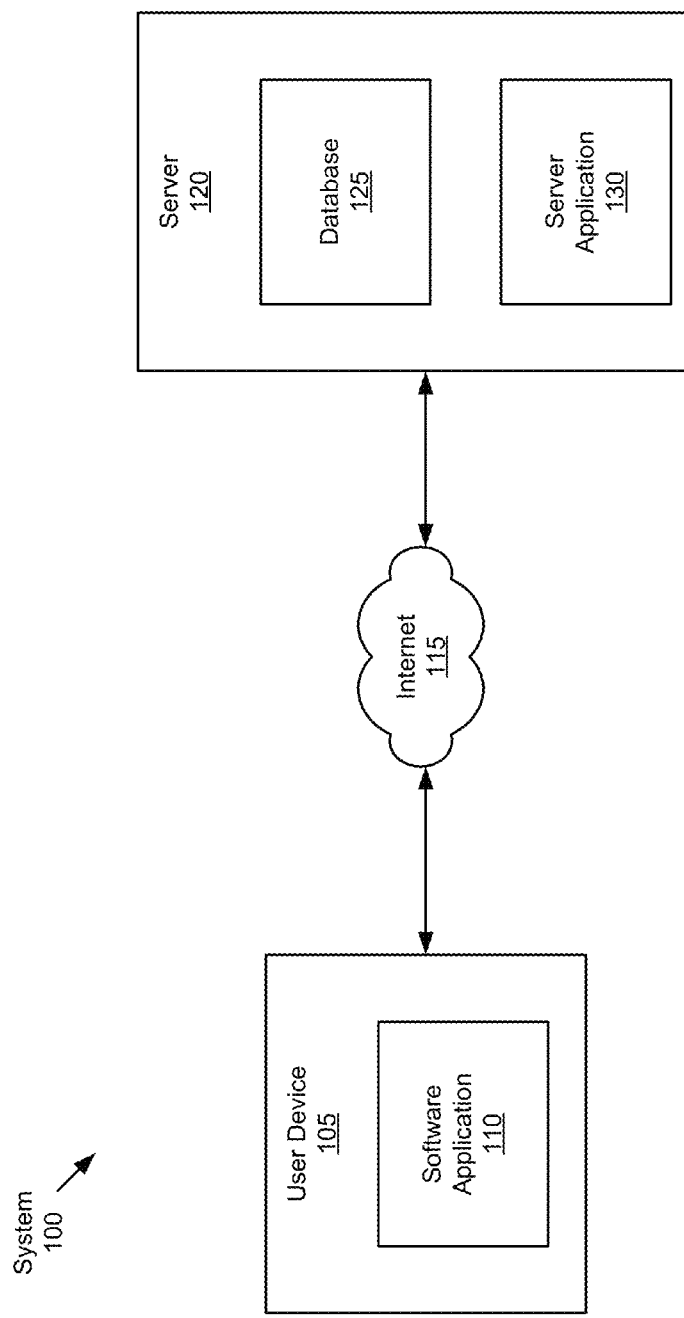
FIG. 1 shows a schematic diagram in accordance with one or more embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Many modern software applications are customizable to suit the needs of an individual user. This customization process may be manual, automatic, or a mix of both. However, many users are unaware of any automatic personalization performed by a software system. Visually displaying the information being used to personalize a piece of software and/or displaying the individual steps taken, may give users the feeling that a given piece of software is exactly what they need and has been deliberately set up for their specific needs. In many cases, the data used to personalize a piece of software is proprietary to the company that collected the data, and would never be shown to an end user. By selectively choosing data to be displayed to the user, the user may gain an understanding of the actions taken on the back end of the system. This display of the work performed (which is normally invisible to the user) may be deliberately slowed down, to further emphasize the work performed. In fact, the displaying of the information used and steps taken may take longer than the actual work (i.e., searching for the information and determining what personalization is needed for a given user).

In general, embodiments of the invention provide a method and system for displaying personalization functionality. Specifically, a plurality of information for a user is sent to a server, and subsequently personalization data is received from the server. The personalization data may comprise a first number of entities similar to the user, a second number of entities similar to the user, and a first personalization action. The first number of entities similar to the user, the second number of entities similar to the user, and the first personalization action are displayed to the user. If desired by the user, the first personalization action may be performed.

FIG. 1 shows a system in accordance with one or more embodiments. FIG. 1 includes a user device (105), a software application (110), the internet (115), a server (120), a database (125), and a server application (130). In one or more embodiments of the invention, the user device (105) may be any device with a processor and memory including, but not limited to: a desktop computer, a laptop computer, a tablet, a smartphone, a feature phone, a server, a blade, a handheld gaming device, smart computing glasses, and/or any other suitable device. The user device (105) may be substantially similar in functionality to the computer system shown in FIG. 4. The user device (105) is communicatively connected to a server (120) via the internet (115). The user device (105) includes the software application (110) in accordance with one or more embodiments of the invention.

In one or more embodiments, the software application (110) is a program or application executing on the user device (105). The software application (110) may be thin client. Alternatively, the software application (110) may be thick client. The software application (110) may be a stand-alone desktop application, such as financial management software, accounting software, a word processing application, a spreadsheet application, a video game and/or any other type of application. In one or more embodiments, the software application (110) is a general purpose web-browser. The software application (110) may include functionality for collecting information about the user of the software application (110), displaying information received from the server (120), and/or performing personalization actions. The software application (110) may collect information about the user in any manner now known or later developed including questionnaires, extracting data from sources, collecting usage information, and/or any other suitable method. In one or more embodiments, collecting user information may be an optional step. The software application (110) may display information received from the server (120) in any suitable format including, but not limited to: pie graphs, bar graphs, charts, venn diagrams, videos, animation, text, and/or any other graphical or visual method of representing information. The personalization actions performed by the software application (110) may be any action to customize a piece of software for a given user including, but not limited to: enabling/disabling a feature, downloading additional forms/data/applications, purchasing an add-on, pre-filling forms, etc. It will be apparent to one of ordinary skill in the art that the software application (110) may take many different forms and have many different functionalities and, as such, the invention should not be limited to the above examples.

In one or more embodiments, the internet (115) is the Internet or alternatively, may be some other kind of network including, but not limited to a Local Area Network (LAN) and/or a cellular network, including wired and or wireless components. It will be apparent to one of ordinary skill in the art that the internet (115) may be any type of network suitable for communication and, as such, the invention should not be limited to the above examples.

In one or more embodiments, the server (120) is a server, rack, distributed computing system, desktop computer, or other suitable device with a processor and memory. The server (120) is communicatively connected with the user device (105) via internet (115). The server (120) includes a database (125) and a server application (130) in accordance with one or more embodiments of the invention. In one or more embodiments, the server (120) may be owned by the company or organization that created the software application (110), by a third party, or any other suitable entity.

In one or more embodiments of the invention, the database (125) may be any hard drive, memory, database management system, or other storage device suitable for maintaining a database. The database (125) may be a component of the server (120). Alternatively, the database (125) may be separate from the server (120). The database (125) may contain any amount and/or type of information. Specifically, the database (125) contains aggregated data related to a variety of users of a software application (e.g., software application (110)). The aggregated data may be collected as users use a software application, submitted voluntarily by the users in response to a survey or other questionnaire, or may be gathered in any other suitable method. The aggregated data may allow conclusions about usage to be drawn. For example, if the software application is an accounting application, the aggregated data may show that self-employed individuals use "Feature X" a large majority of the time, while employees of large corporations almost never use "Feature X." It will be apparent to one of ordinary skill in the art that many different kinds of data may be collected in many different ways, and used to draw many different conclusions and, as such, the invention should not be limited to the above examples. In one or more embodiments, the database (125) may store the aggregated data in tree form, or other similar form that enables searches to be performed at various levels of granularity. For example, if the factor being searched is "geographic location" then different granularities may be city, zip code, county, region, state, country, continent, etc.

In one or more embodiments, the server application (130) is any application or program executing on the server (120). The server application (130) includes functionality to search the database (125), determine users similar to the user of the user device (105), set/adjust thresholds, and send the personalization information to the user device (105). The server application (130) may search the database in any manner now known or later developed, such as using collaborative filtering. Thresholds may be used in the searching/determining similar users to ensure that there is a large enough pool of similarly situated users. For example, if there are only five similar users in a given town, the search may be expanded to the next largest city where five hundred similar users may be located, thereby increasing the accuracy of the personalizations. In one or more embodiments of the invention, the server application (130) may be the back end of a thin-client implementation of the software application (110), and may perform processing for the user and/or include all of the functionality of software application, or any other suitable functionality.

Figure 2:
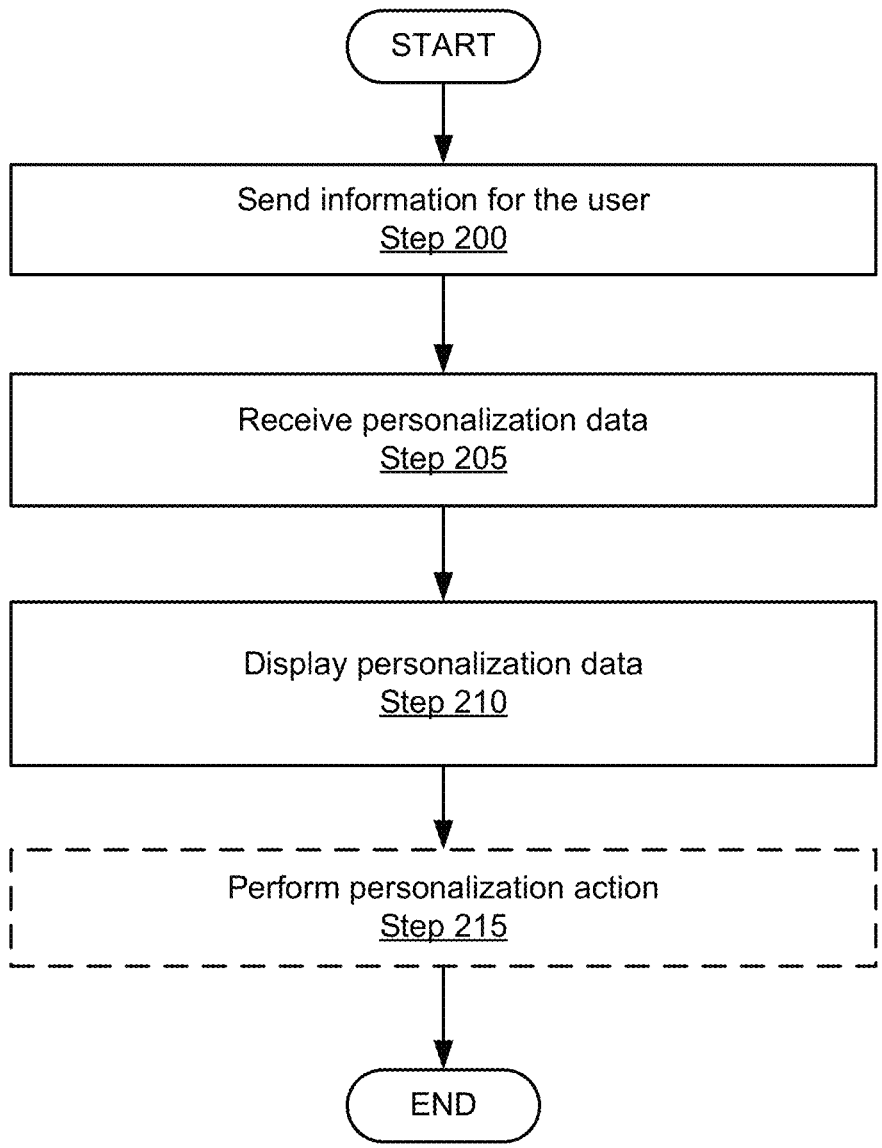
FIG. 2 shows a flowchart of a method in accordance with one or more embodiments.

FIG. 2 shows a flowchart of a method for displaying personalization functionality. While the various steps in this flowchart are presented and described sequentially, one of ordinary skill in the art will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIG. 2 should not be construed as limiting the scope of the invention.

In Step 200, information for the user is sent to a server, in accordance with one or more embodiments. The information sent to the server may be any data about the user including, but not limited to: age, sex, business type, field of business, age of business, number of employees, income, profits, debt, accounts payable, accounts receivable, tax status, location, etc. The information may be collected in any suitable manner such as a question and answer session, a form, a phone conversation, text messages, and/or any other suitable manner. In one or more embodiments, Step 200 is optional.

The server uses the information to search aggregated data to determine whether other users are similar to the user. Optionally, other information may be used to search the aggregated data, such as the behavior of the user when interacting with the software, or other available data. In one or more embodiments of the invention, other similar users may be every user who uses the same piece of software, are located within a given geographic region, operate the same type of business, are the same age, have the same number of employees, and/or any other suitable standard, as well as combinations (e.g., same geographic region and business type). Once identified, the similar users may be used to personalize the software to the settings the user will likely need and/or use.

In one or more embodiments of the invention, there may be thresholds on the number of similar users. For example, if the search performed is for all car dealers in Tinytown, Calif., the search may return only one car dealer. Only one result may not give a user much confidence that the personalizations based on one other dealership are relevant to them. Thus, the search may be expanded to include all car dealers in northern CA, thereby returning many more results. It will be apparent to one of ordinary skill in the art that the thresholds may be minimums or maximums, and may be managed in a variety of ways and, as such, the invention should not be limited to the above examples.

In Step 205, the personalization data is received, in accordance with one or more embodiments. The personalization data may be received in any format now known or later developed. In one or more embodiments, the personalization data may be received all at once (i.e., after all similar users have been identified), or may be received in real time.

In Step 210, the personalization data is displayed, in accordance with one or more embodiments. The personalization data may be displayed in any manner now known or later developed. Specifically, the personalization data may be displayed in a pie chart, bar graph, text, video, animation, any other suitable method and/or any combination of the above mentioned methods. Additionally, the personalization data may not be displayed all at once. Rather, the personalization data may be displayed slowly over time, in sections. The duration of the display may be predetermined, set by the user, may vary based on the amount of personalization data, and/or any other suitable amount of time or standard. The personalization data may be deliberately displayed slowly to emphasize the amount of work being performed by the system (even though the system may be able to perform the work nearly instantaneously).

In Step 215, a personalization action is performed, in accordance with one or more embodiments. The personalization action may be performed in any manner now known or later developed. In one or more embodiments, Step 215 is optional, as the user may be prompted whether he/she wants the personalization action to be performed, and thus may chose not to perform the personalization action. The personalization action may be any suitable action including, but not limited to: enabling a software feature, disabling a software featuring, installing an application, uninstalling an application, downloading forms/data/etc, uploading forms/data/etc, changing a layout, changing a setting, changing the wording used in menus, forms, titles, etc, to industry specific nomenclature, and/or any other change. It will be apparent to one of ordinary skill in the art that the personalization action may be any change based on the personalization data and, as such, the invention should not be limited to the above examples. After Step 215, the method ends in accordance with one or more embodiments of the invention.

Figure 3A:
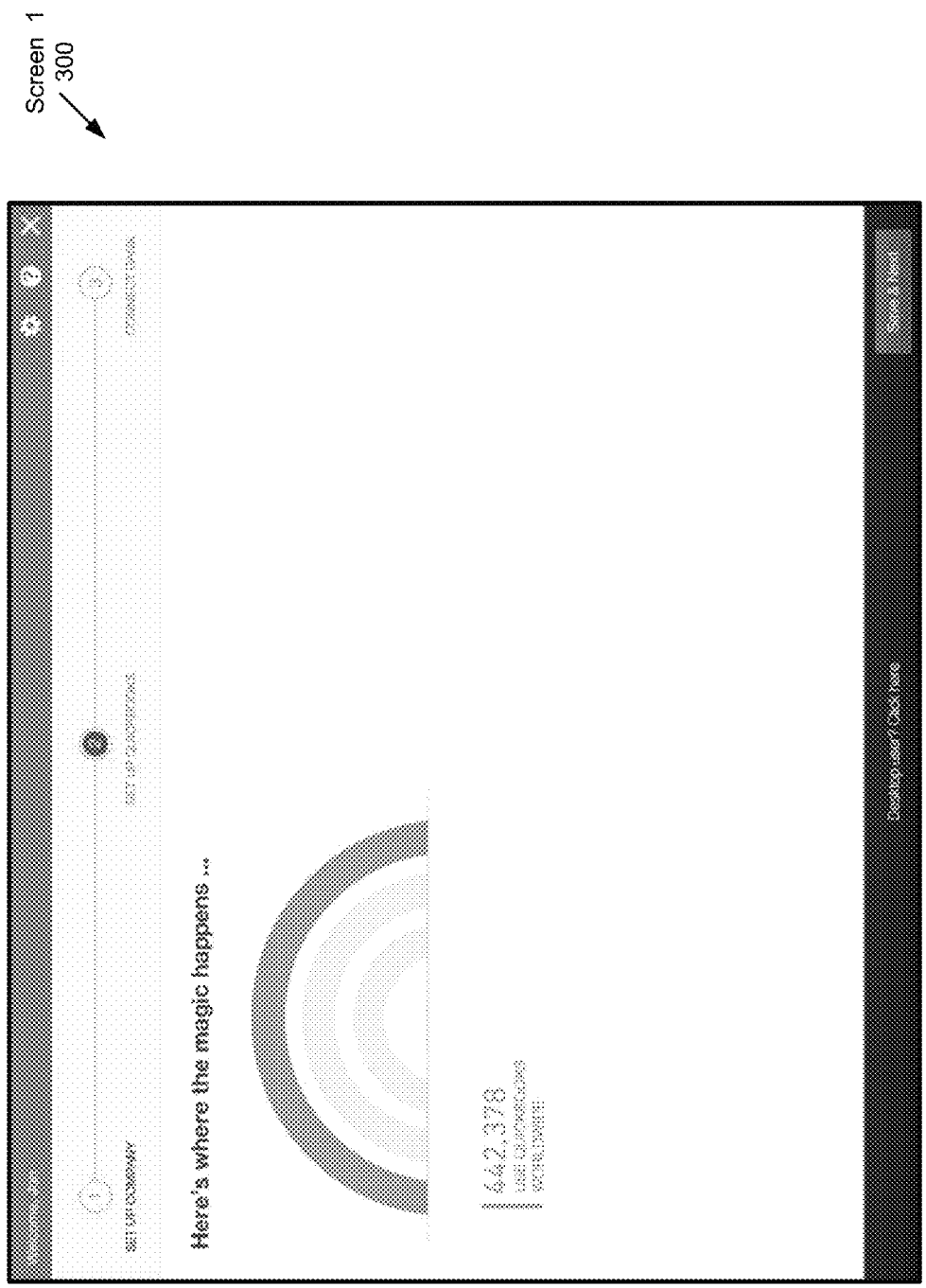
FIGS. 3A, 3B, 3C, and 3D show an example in accordance with one or more embodiments.

The following section describes various examples of the invention. The examples are included to aid in the understanding of the invention and are not intended to limit the scope of the invention, FIGS. 3A, 3B, 3C, and 3I) show an example in accordance with one or more embodiments. Specifically, FIGS. 3A, 3B, 3C, and 3D show a mock display of personalization data for a business using accounting software. After information about the business is collected and sent to the server, the server returns a variety of personalization data. In FIG. 3A, screen 1 (300) shows a first screen displayed to the user to highlight the "behind the scenes" personalization work performed. Screen 1 (300) shows that there are 442,378 users of the account software. This is the first set of similar users—everyone who uses the same accounting software. Optionally, the graph representing the 442,378 users may slowly fill up over 2-3 seconds. After a short pause, the example moves to FIG. 3B.

Figure 3B:
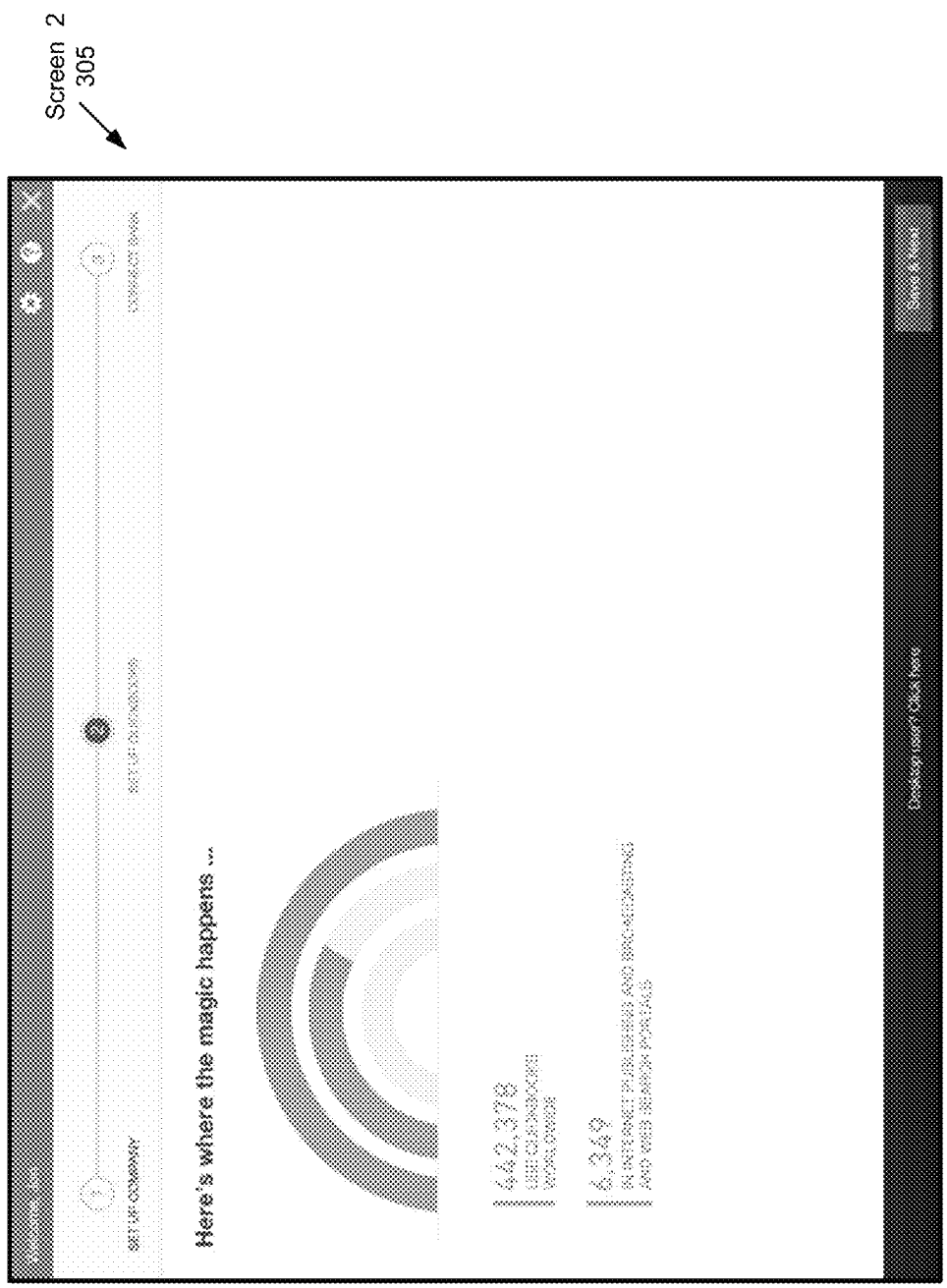

In FIG. 3B, screen 2 (305) is shown. Screen 2 (305) shows the same data from FIG. 3A, but also includes a second set of similar users—all users of the same business type. Screen 2 (305) shows that there are 6,349 users in the internet publishing, broadcasting, and web search business. Each of these three types of businesses may be separately identified, but they are combined together to ensure that a threshold number of similar users is reached, to reinforce that the work being performed is accurate to the needs of the current user. Similar to screen 1 (300), the graph representing the 6,349 users may slowly fill up over a predetermined number of seconds to emphasize the work being performed by the system. After a short pause, the example moves to FIG. 3C.

Figure 3C:
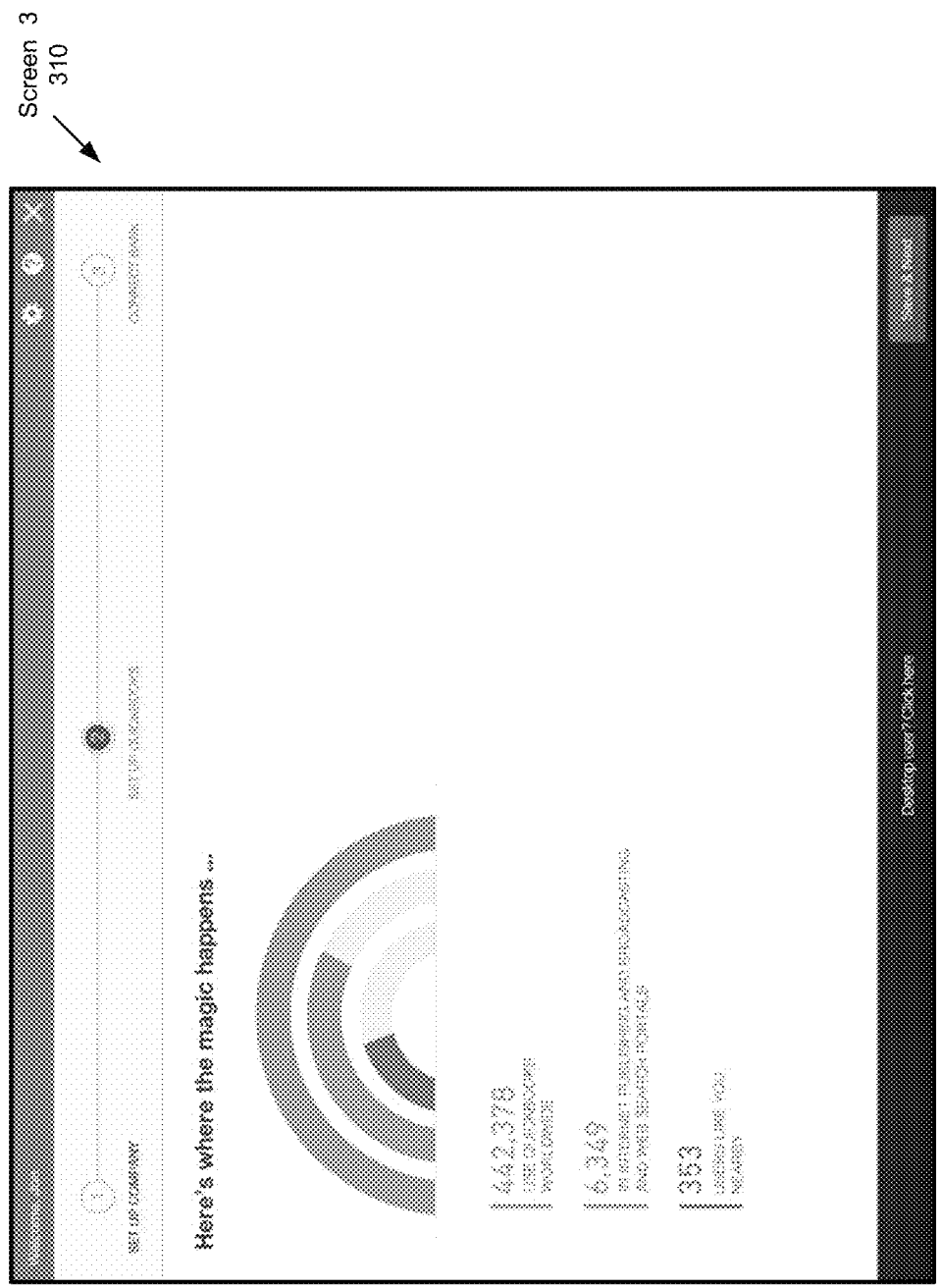

In FIG. 3C, screen 3 (310) is shown. Screen 3 (310) shows the same data from FIG. 3B, but also includes a third set of similar users—the subset of the similar businesses who are also in a nearby geographic area. The geographic area may be any size such as: city, county, region, state, country, continent, etc. Further, the geographic scope used for identifying similar users may be adjusted by the system as needed to ensure that a threshold number of similar users are reached. In screen 3 (310) there are 353 nearby users of the same business type. As before, the graph representing the 353 users may slowly fill up over a predetermined number of seconds to emphasize the work being performed by system. After a short pause, the example move to FIG. 3D.

Figure 3D:
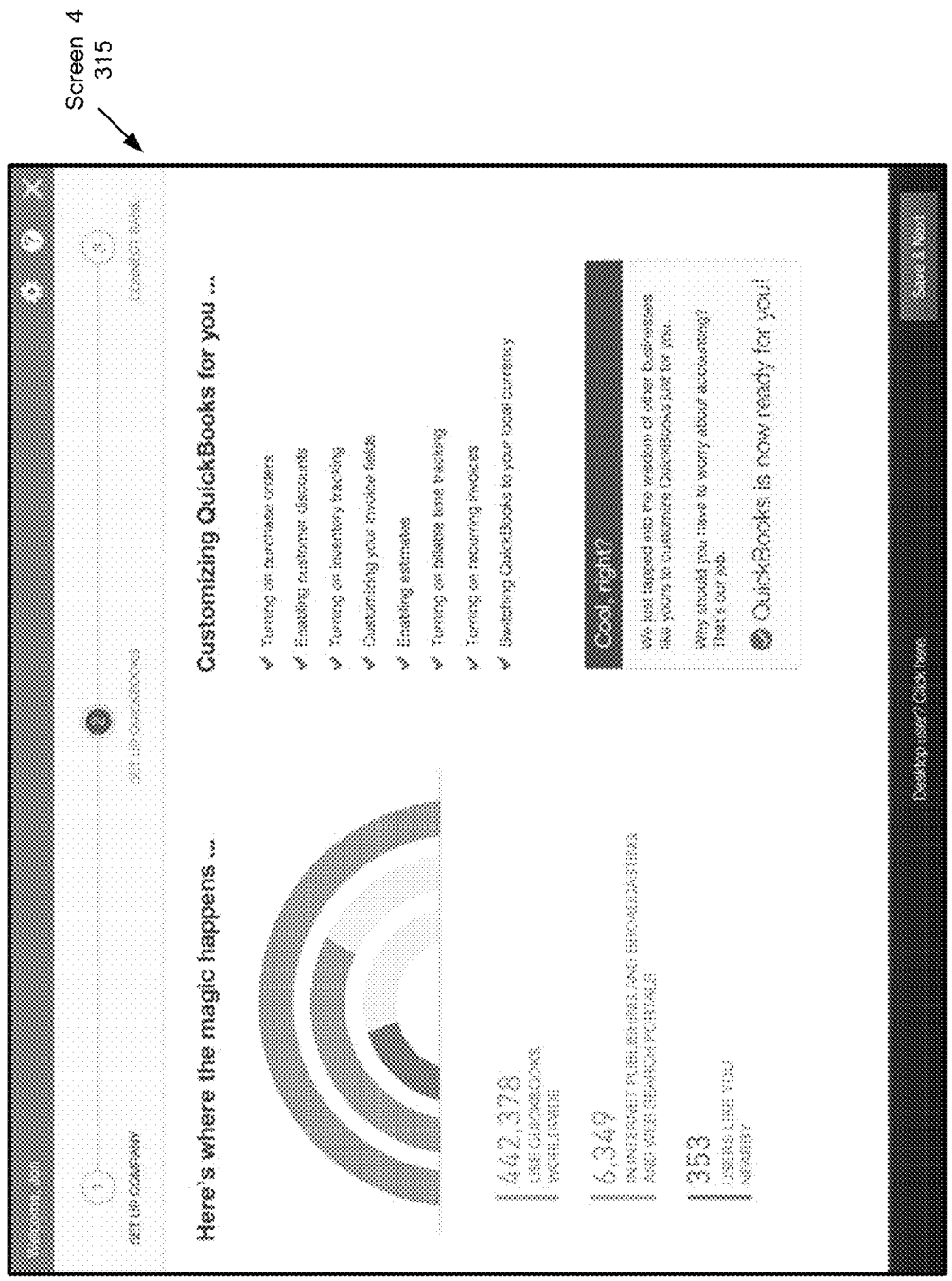

In FIG. 3D, screen 4 (315) is shown. Screen 4 (315) shows the same data as from FIG. 3C, but also include a list of personalization actions performed. These personalization actions are based on the similarly identified users and include many different types of actions. In this example, the list of customizations made may slow pop up on the user's computer screen one at a time, until all actions performed have been shown. Optionally, some actions performed may not be listed.

It will be apparent to one of ordinary skill in the art that this invention helps emphasize to an end user the work performed by a computer system. One common problem with computers is that vast amounts of data may be searched, and many actions taken, quickly. This may lead to some users thinking that no personalization or customization has been performed. In contrast, when things are performed by a human (e.g., applying for a loan in person at a bank) it is very clear to all the work involved and actions performed. Thus, by showing portions of the data used to personalize, showing the steps taken, and displaying this in a deliberate manner, a user may feel as though much work is being performed just for them, ensuring that the software is automatically tailored to their needs.

Figure 4:
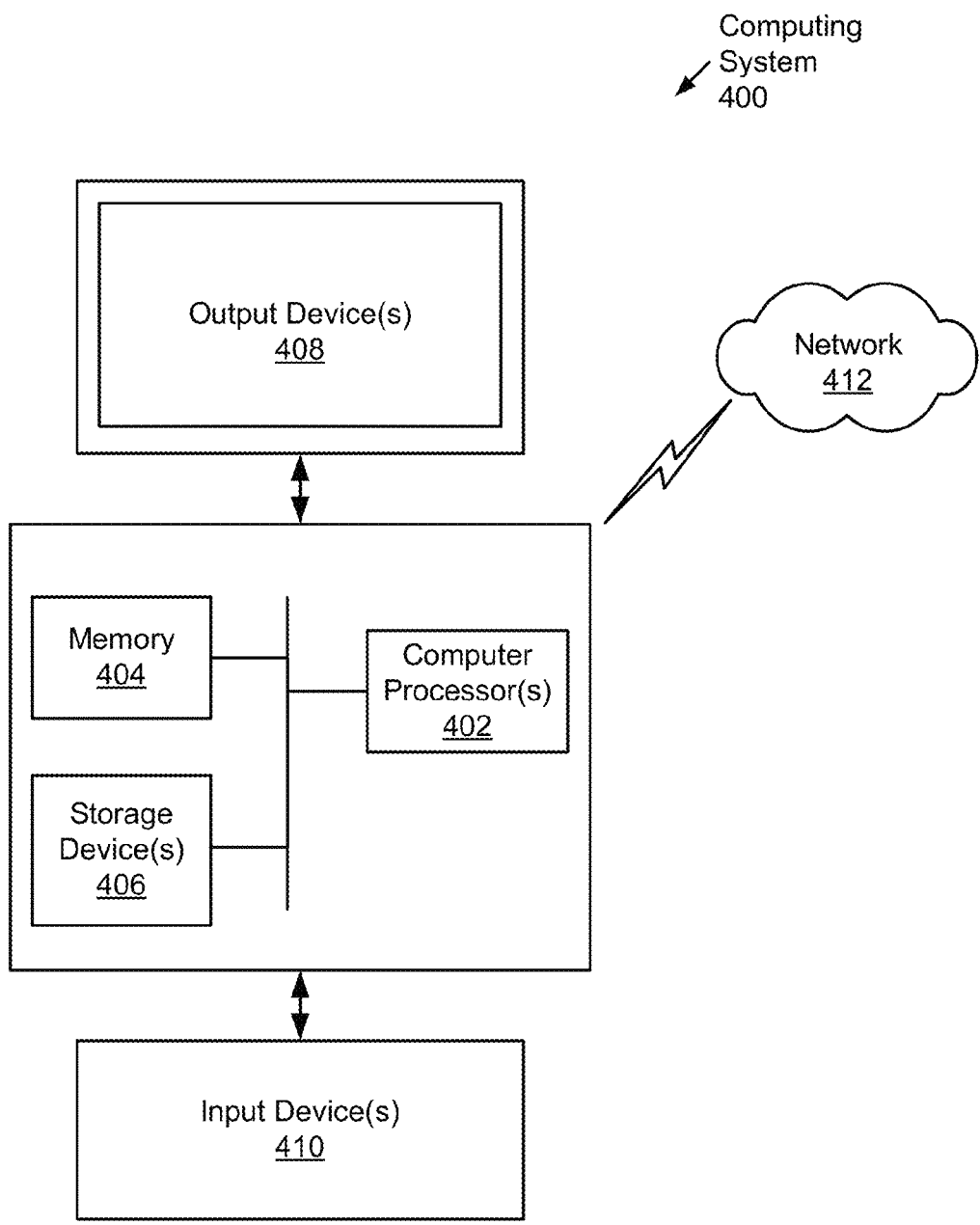
FIG. 4 shows a computer system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, smart computing glasses, or other mobile device), desktop computers, servers, blades in a server chassis, or any other type of computing device or devices that includes at least the minimum processing power, memory, and input and output device(s) to perform one or more embodiments of the invention. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, sensors, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and connected to the other elements over a network (412). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or microcore of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for displaying personalization functionality, comprising:
   sending, by a processor, a plurality of information for a user to a server;
   receiving, by the processor, personalization data from the server comprising a first number of entities similar to the user, a second number of entities similar to the user, and a first personalization action, wherein the first personalization action is determined based on user information of the second number of entities similar to the user;
   determining, by the processor based on a pre-determined proportional factor, a first time delay and a second time delay that are proportional to an amount of work performed by the server to provide the first number of entities similar to the user, the second number of entities similar to the user, and the first personalization action;
   displaying, by the processor, the first number of entities similar to the user;
   displaying, by the processor and subsequent to the first time delay from displaying the first number of entities similar to the user, the second number of entities similar to the user;
   displaying, by the processor and subsequent to the second time delay from displaying the second number of entities similar to the user, the first personalization action; and
   performing the first personalization action.

2. The method of claim 1, wherein the first number of entities similar to the user comprises all entities using a same software application as the user.

3. The method of claim 1, wherein the second number of entities similar to the user comprise all entities from the first number of entities that reside in a same geographic area as the user.

4. The method of claim 3, wherein the server selects a granularity for the same geographic area as the user based on the second number of entities similar to the user exceeding a threshold.

5. The method of claim 1, wherein the first personalization action comprises disabling a software feature.

6. The method of claim 1, wherein the first personalization action comprises one selected from a group of enabling a software feature, downloading a form, and changing a nomenclature.

7. The method of claim 1, wherein displaying the first number of entities similar to the user is slow to emphasize the personalization being done.

8. The method of claim 1, wherein the first number of entities similar to the user is displayed as a bar graph.

9. A non-transitory computer-readable medium (CRM) storing a plurality of instructions for displaying personalization functionality, the plurality of instructions comprising functionality to:
   send a plurality of information for a user to a server;
   receive personalization data from the server comprising a first number of entities similar to the user, a second number of entities similar to the user, and a first personalization action, wherein the first personalization action is determined based on user information of the second number of entities similar to the user;
   determine, based on a pre-determined proportional factor, a first time delay and a second time delay that are proportional to an amount of work performed by the server to provide the first number of entities similar to the user, the second number of entities similar to the user, and the first personalization action;
   display the first number of entities similar to the user;
   display, subsequent to the first time delay from displaying the first number of entities similar to the user, the second number of entities similar to the user;
   display, subsequent to the second time delay from displaying the second number of entities similar to the user, the first personalization action; and
   perform the first personalization action.

10. The non-transitory CRM of claim 9, wherein the first number of entities similar to the user comprises all entities using a same software application as the user.

11. The non-transitory CRM of claim 9, wherein the second number of entities similar to the user comprise all entities from the first number of entities that reside in a same geographic area as the user.

12. The non-transitory CRM of claim 11, wherein the server selects a granularity for the same geographic area as the user based on the second number of entities similar to the user exceeding a threshold.

13. The non-transitory CRM of claim 9, wherein the first personalization action comprises disabling a software feature.

14. The non-transitory CRM of claim 9, wherein the first personalization action comprises one selected from a group of enabling a software feature, downloading a form, and changing a nomenclature.

15. The non-transitory CRM of claim 9, wherein displaying the first number of entities similar to the user is slow to emphasize the personalization being done.

16. The non-transitory CRM of claim 9, wherein the first number of entities similar to the user is displayed as a bar graph.

17. A system for displaying personalization functionality, comprising:
- a server configured to:
  - receive a plurality of information for a user; and
  - send personalization data from the server comprising a first number of entities similar to the user, a second number of entities similar to the user, and a first personalization action;
- a user device communicatively coupled to the server, wherein the user device comprises a processor and a memory storing instructions executable by the processor, the instructions comprising functionality to:
  - send the plurality of information for the user to the server;
  - receive the personalization data from the server comprising the first number of entities similar to the user, the second number of entities similar to the user, and the first personalization action, wherein the first personalization action is determined based on user information of the second number of entities similar to the user;
  - determine, based on a pre-determined proportional factor, a first time delay and a second time delay that are proportional to an amount of work performed by the server to provide the first number of entities similar to the user, the second number of entities similar to the user, and the first personalization action;
  - display the first number of entities similar to the user;
  - display, subsequent to the first time delay from displaying the first number of entities similar to the user, the second number of entities similar to the user;
  - display, subsequent to the second time delay from displaying the second number of entities similar to the user, the first personalization action; and
  - perform the first personalization action.

18. The system of claim 17, wherein the first number of entities similar to the user comprises all entities using a same software application as the user.

19. The system of claim 17, wherein the second number of entities similar to the user comprise all entities from the first number of entities that reside in a same geographic area as the user.

20. The system of claim 19, wherein the server selects a granularity for the same geographic area as the user based on the second number of entities similar to the user exceeding a threshold.

21. The system of claim 17, wherein the first personalization action comprises disabling a software feature.

22. The system of claim 17, wherein the first personalization action comprises one selected from a group of enabling a software feature, downloading a form, and changing a nomenclature.

23. The system of claim 17, wherein displaying the first number of entities similar to the user is slow to emphasize the personalization being done.

\* \* \* \* \*